(12) United States Patent
Chen et al.

(10) Patent No.: US 7,477,618 B2
(45) Date of Patent: Jan. 13, 2009

(54) METHOD AND APPARATUS FOR STEALING POWER OR CODE FOR DATA CHANNEL OPERATIONS

(75) Inventors: Tao Chen, San Diego, CA (US); Yongbin Wei, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 980 days.

(21) Appl. No.: 10/280,920

(22) Filed: Oct. 25, 2002

(65) Prior Publication Data

US 2004/0081112 A1 Apr. 29, 2004

(51) Int. Cl.
*H04B 7/185* (2006.01)
(52) U.S. Cl. ..................................... 370/318
(58) Field of Classification Search ................. 370/318, 370/342, 335, 441, 465, 332, 468, 538, 206; 455/522, 450, 452, 69, 452.2, 422, 442, 436, 455/13.4; 398/94, 92, 29, 32, 34, 38; 375/130, 375/134, 136; 713/163; 342/352, 16
See application file for complete search history.

(56) References Cited

U.S. PATENT DOCUMENTS

| | | | | |
|---|---|---|---|---|
| 4,727,536 | A * | 2/1988 | Reeves et al. | 370/468 |
| 5,923,650 | A | 7/1999 | Chen et al. | |
| 6,128,111 | A * | 10/2000 | Roberts | 398/29 |
| 6,160,798 | A | 12/2000 | Reed et al. | |
| 6,496,531 | B1 * | 12/2002 | Kamel et al. | 375/130 |
| 6,804,255 | B1 * | 10/2004 | Zheng et al. | 370/468 |
| 6,934,555 | B2 * | 8/2005 | Silva et al. | 455/522 |
| 6,963,741 | B2 | 11/2005 | Johansson et al. | |
| 6,980,808 | B1 * | 12/2005 | Smith | 455/450 |
| 7,046,640 | B2 * | 5/2006 | Silva et al. | 370/318 |
| 2002/0183066 | A1 * | 12/2002 | Pankaj | 455/453 |
| 2003/0064741 | A1 * | 4/2003 | Silva et al. | 455/522 |
| 2003/0084283 | A1 * | 5/2003 | Pixton | 713/163 |
| 2004/0179846 | A1 * | 9/2004 | Yue et al. | 398/94 |

FOREIGN PATENT DOCUMENTS

| | | |
|---|---|---|
| EP | 0805568 | 11/1997 |
| EP | 1061680 | 12/2000 |

OTHER PUBLICATIONS

Srivastava, A.K.; Signal Power Transients in Optically Amplified WDM Ring Networks 1998, OFC '98 Technical Digest, Bell Laboratories, Lucent Technologies, p. 164-165.*
International Search Report—PCT/US03/034571, International Search Authority—European Patent Office—Apr. 5, 2004.

* cited by examiner

*Primary Examiner*—Wing F Chan
*Assistant Examiner*—Prenell P Jones
(74) *Attorney, Agent, or Firm*—Albert J. Harnois, Jr.; Dang M. Vo; Thomas R. Rouse (57) ABSTRACT

Techniques for stealing power or channelization code for data channel operations are disclosed. In an aspect, a Walsh channel is taken from a voice call and allocated to a data channel. In an aspect, power is taken from a voice call and allocated to a data channel. In an aspect, a Walsh code is taken from a voice call if the quality of the voice call does not decrease below a threshold. In an aspect, power is taken from a voice call if the quality of the voice call does not decrease below a threshold.

22 Claims, 5 Drawing Sheets

METHOD AND APPARATUS FOR STEALING POWER OR CODE FOR DATA CHANNEL OPERATIONS

BACKGROUND

1. Field

The present invention relates generally to communications, and more specifically to a novel and improved method and apparatus for stealing power or channelization code for data channel operations in a communication system.

2. Background

Wireless communication systems are widely deployed to provide various types of communication such as voice and data. These systems may be based on code division multiple access (CDMA), time division multiple access (TDMA), or other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from the mobile station, very fast scheduling, and scheduling for services that have more relaxed delay requirements. An example of such a data-only communication system using these techniques, is the high data rate (HDR) system that conforms to the TIA/EIA/IS-856 standard (the IS-856 standard).

In contrast to the other above named standards, an IS-856 system uses the entire spectrum available in each cell to transmit data to a single user at one time, selected based on link quality. In so doing, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in "TR-45.5 Physical Layer Standard for cdma2000 Spread Spectrum Systems, Release C" (the IS-2000 standard), also known as the 1xEV-DV proposal.

A system such as the one described in the 1xEV-DV proposal generally comprises channels of four classes: overhead channels, dynamically varying IS-95 and IS-2000 channels, a forward packet data channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH is typically used for data services that are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate that is supportable on the F-PDCH depends primarily upon the available power and Walsh codes after the power and Walsh codes for the overhead, IS-95, and IS-2000 channels have been assigned. The data transmitted on the F-PDCH is spread using one or more Walsh codes.

If the data rate required to transmit data on the F-PDCH is not supported by the available power and Walsh codes after the power and Walsh codes for the overhead, IS-95, and IS-2000 channels have been assigned, then F-PDCH data transmissions will be compromised.

There is therefore a need in the art for a method and apparatus to obtain the power, or the power and the Walsh codes necessary to transmit data on a data channel.

SUMMARY

Embodiments disclosed herein address the need for a method and apparatus to obtain the power, or the power and the Walsh codes necessary to transmit data on a data channel.

In an aspect, a method of data channel transmission comprises determining an amount of power allocated to a data channel, determining a total amount of power the data channel requires for data channel transmission, determining additional power the data channel requires as the total amount of power the data channel requires for data channel transmission less the amount of data channel power, selecting an active channel for power stealing based on a selection algorithm, the active channel being selected in response to the data channel requiring additional power; and stealing power from the selected active channel and using the stolen power for data channel transmission.

In an aspect, a method of data channel transmission further comprises determining that the data channel requires a Walsh code for data channel transmission, selecting an active channel for stealing its Walsh code based on a selection algorithm, the active channel being selected in response to the data channel requiring a Walsh code, and stealing the Walsh code from the active channel and using the stolen Walsh code for data channel transmission.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
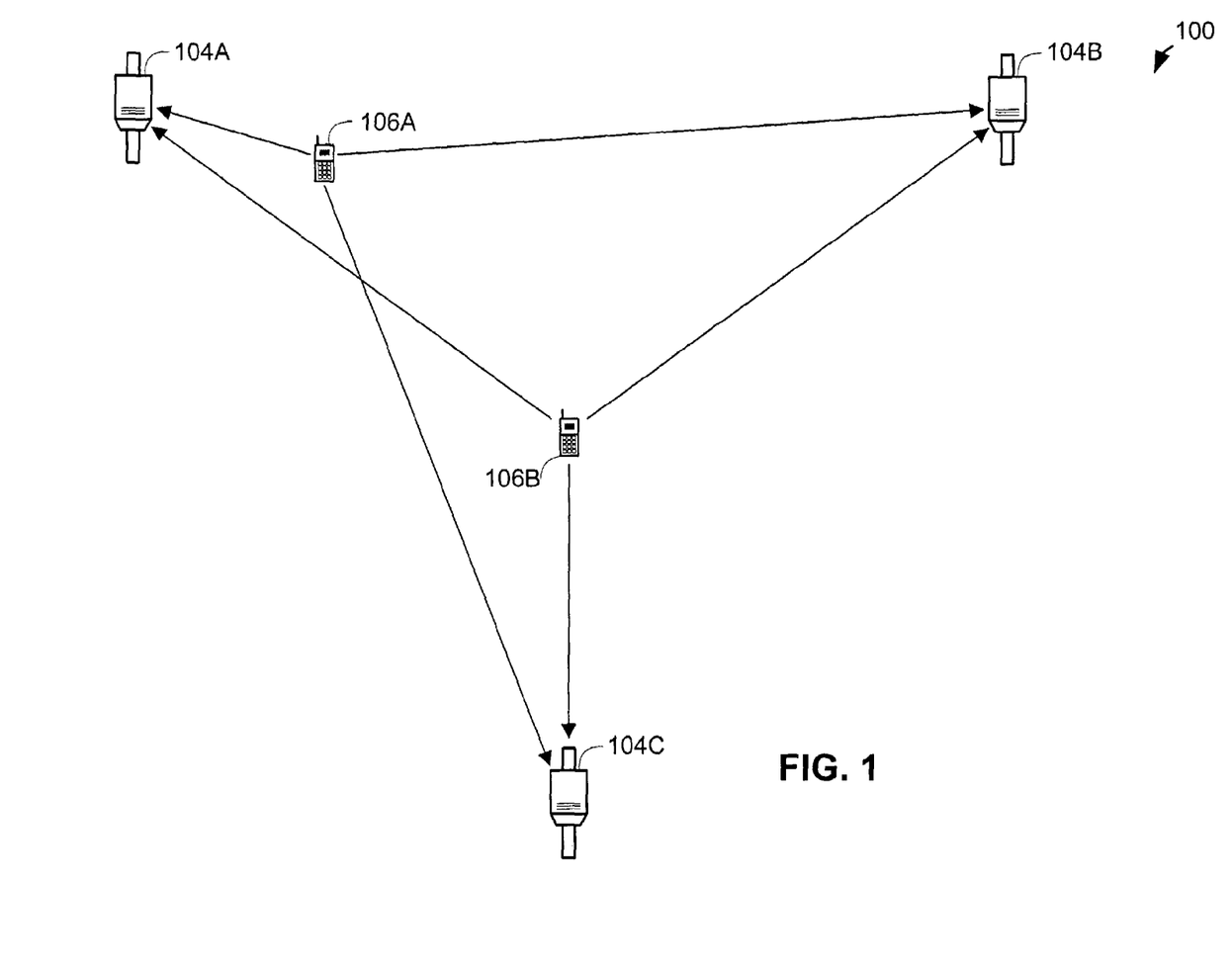
FIG. 1 is a wireless communication system that supports a number of users, and which can implement various aspects of the invention.

FIG. 1 is a diagram of a wireless communication system 100 that supports a number of users, and can implement various aspects of the invention. System 100 may be designed to support one or more CDMA standards and/or designs (e.g., the W-CDMA standard, the IS-95 standard, the IS-2000 standard, the IS-856 standard, the 1xEV-DV proposal). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A common application for communication system 100 is to provide packet data service for mobiles, including a connection to the Internet. A base station 104 may comprise one or more base station transceiver subsystems (BTS), connected to a base station controller (BSC). A Packet Data Service Node (PDSN), used to send data to and receive data from a network, such as the Internet, connects to the BSC within one or more base stations to provide packet services to the mobile stations in communication therewith via one or more BTSs. Various protocols for packet data are known in the art and can be applied at the appropriate locations throughout communication system 100. These details are not shown in FIG. 1.

A system such as that described in the 1xEV-DV proposal uses the remaining transmit power, after power has been allocated to support existing channels such as voice, to transmit at the highest rate supportable to a single mobile station at a time. A 1xEV-DV system may also transmit to multiple mobile stations at the same time, a mode that is also supported within the scope of the present invention. The data channel for forward transmission is referred to as the Forward Packet Data Channel (F-PDCH). The choice of mobile station for transmission is based in large part on channel quality indicators, which are transmitted to the base station by each mobile station with a packet data connection. The channel quality indicator messages are sent to the base station on a channel referred to as the Reverse Channel Quality Indicator Channel (R-CQICH). The base station will avoid sending to a mobile station that is experiencing poor channel quality at the time, opting instead to send at high rate to another mobile station, returning to the first after the channel quality improves. The base station can also carry broadcast/multicast service on the F-PDCH. The transmission time of broadcast/multicast content on the F-PDCH can be pre-scheduled or dynamically scheduled.

The base station uses a control channel in association with the forward data channel. One such channel is the Forward Primary Data Control Channel (F-PDCCH). Control channels can be used to convey broadcast information to all the mobiles, or targeted messages to a single mobile. A control message may indicate which mobile is to receive the data on the F-PDCH, the rate, the number of packets, and similar information. For broadcast/multicast, a control message may convey the information necessary to receive to the broadcast/multicast transmission on the F-PDCH.

A send and re-transmit protocol can be established to ensure packets destined for mobile stations arrive as transmitted. A mobile station sends an acknowledgement to the base station when it receives a packet on the forward data channel. This acknowledgement can be sent on the Reverse Acknowledgement Channel (R-ACKCH). If an acknowledgement fails to arrive from a mobile station after the base station transmits to it, the base station can re-transmit the packet. In an exemplary embodiment, the base station will attempt to re-transmit a packet four times.

The mobile stations can also transmit data to the base station on the reverse link. One channel for reverse link data transmission is referred to as the Reverse Supplemental Channel (R-SCH). A reverse link control channel is used to indicate the rate data is transmitted on the R-SCH, referred to as the Reverse Rate Indicator Channel (R-RICH).

Data transmitted on the forward data channel, or F-PDCH, may be spread using one or more Walsh codes. In an exemplary embodiment, the data may be covered using up to 28 Walsh codes (also called Walsh functions). As described above, the amount of transmission power available for F-PDCH transmission, and the number of Walsh channels needed, varies as the number of voice and other data channels varies. It is necessary for the base station to communicate to the mobile stations the number of Walsh channels being used during upcoming transmissions, which Walsh channels they are, and the order that the data will be modulated on the Walsh channels. This collective set of information can be referred to as the Walsh space.

Techniques for assigning Walsh space is disclosed in U.S. patent application Ser. No. 10/179,782, entitled "METHOD AND APPARATUS FOR WALSH SPACE ASSIGNMENT IN A COMMUNICATION SYSTEM", filed Feb. 19, 2002, assigned to the assignee of the present invention.

Due to the bursty nature of packet data, some users' data connections may not be active. These mobile stations enter a state known as the dormant state in many of the CDMA standards (see TIA/EIA/IS-707, *Data Service Options for Spread Spectrum Systems*). When the mobile or base station has data to send, signaling is used to place the mobile station onto the traffic channel. From time to time, users may move out of or into the cell, and others may initiate or terminate their connection. Each mobile station, to receive data on the F-PDCH, must have the Walsh codes, also referred to as the Walsh space, being used for the F-PDCH, also. Since the Walsh space will tend to vary dynamically with time and may vary between cells (or sectors within a cell), Walsh space information is relayed to the various users within each cell, including mobile stations coming out of the dormant state.

A message is sent on a broadcast channel, referred to as a Forward Broadcast Control Channel (F-BCCH) containing the Walsh numbers and the number of channels for various forward channels, including the F-PPDCCH, the F-SPD-CCH, and the F-PDCH. In an exemplary embodiment, the F-PDCH may use up to 28 Walsh functions (also called Walsh codes). The list of functions for use in transmission and reception of the F-PDCH is referred to herein as the Walsh list. In an alternative embodiment, a default list is used in lieu of transmission of the Walsh list on the F-BCCH. An example of a Walsh list is shown in Table 1. In this example, the Walsh functions to be used are 31, 15, 30, 14, and so on. In addition to the Walsh list, the base station and the mobile stations need to agree on the order in which symbols are applied to the various Walsh functions, so as to facilitate proper decoding.

TABLE 1

Default Walsh List for F-PDCH
(in 32 Space)

31
15
30
14
29
13
28
12
27
11
26
10
25
9
24
8
23
7
22
6
21
5
20
4
19
3
18
2

Once the overall Walsh space is defined, the sub-space to be used for any particular transmission on the F-PDCH can be indicated referred to herein as a Walsh space indicator. The Walsh space indicator specifies how many Walsh functions are to be used. The Walsh list, and associated modulation order, can then be used with the Walsh space indicator to identify the Walsh functions for use in data communication.

Figure 2:
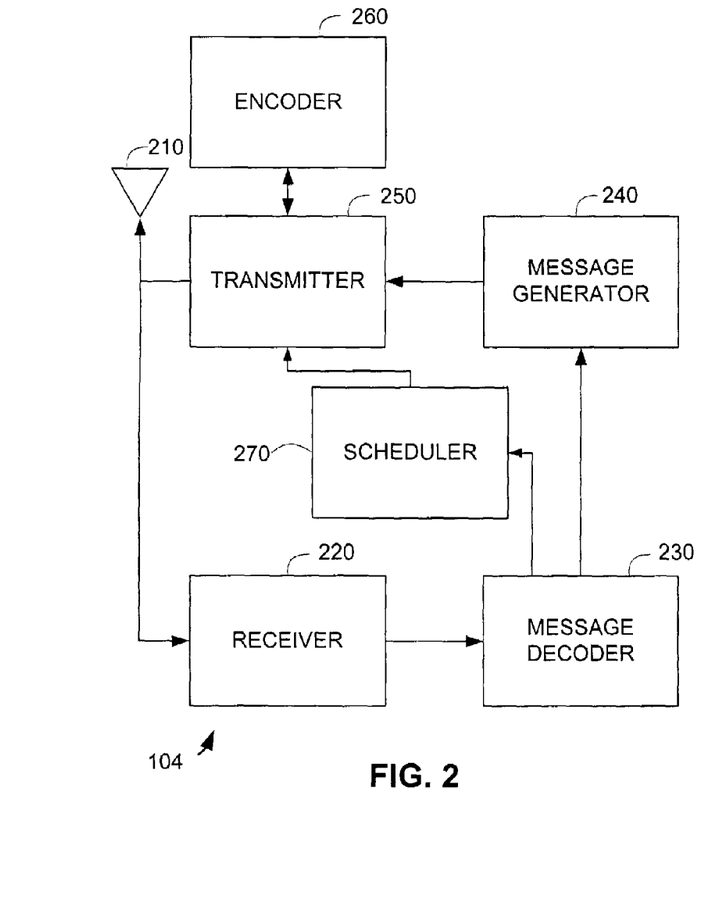
FIG. 2 depicts an exemplary base station.

FIG. 2 depicts an exemplary base station 104. For clarity, only a subset of the components relating to this description are shown. Forward link signals are transmitted from and reverse link signals are received on antenna 210. The forward link signals are generated in transmitter 250, which is shown communicatively coupled with encoder 260. Transmitter 250 may process data for transmission using a variety of techniques, known in the art. Examples of such processing include Walsh Covering, pseudo-random noise (PN) spreading, interleaving, encoding, radio-frequency (RF) processing such as up-conversion and carrier modulation, and the like. When transmitting data on the F-PDCH, transmitter 250 covers the appropriate data symbols with the corresponding Walsh functions as defined in the current Walsh space. Encoder 260 may be included as part of transmitter 250, but is shown as a separate element in FIG. 2 for clarity of discussion below. Encoder 260 can employ various encoding schemes, examples include Cyclic Redundancy Check (CRC) encoding, convolutional or block encoding, turbo encoding, and the like. Among other data that can be transmitted on the forward link via transmitter 250 and antenna 210, for example, packet data, as described above with respect to FIG. 1, are messages generated in message generator 240. Messages generated in message generator 240 may be control messages for transmission on the F-PPDCH or the F-SPDCCH, which are processed and transmitted in transmitter 250.

Reverse link signals are delivered from antenna 210 to receiver 220, where various processing, known in the art, is used to retrieve data from the reverse link signals. Examples of the processing that can be performed in receiver 220 include amplification, RF down-conversion, demodulation (including PN despreading and Walsh decovering), combining, deinterleaving, decoding, and the like.

Data from receiver 220 may have various destinations, one of which is shown as message decoder 230. Message decoder 230 can decode various messages sent from one or more mobile stations, such as those reverse link messages described above. Message generator 240 is responsive to message decoder 230, in that some forward link messages are generated in response to information carried in reverse link messages.

Channel quality may be measured in terms of a carrier-to-interference (C/I) ratio and is based upon received forward link signals. The mobile station transmits the C/I values continuously, so that the base station is aware of the channel conditions if ever any packets need to be transmitted on the forward link to that mobile station. A scheduler 270 receives a channel quality value, for example a decoded C/I value, and orchestrates the appropriate transmission formats, power levels, and data rates of transmissions from the transmitter 250 on the forward link.

Note that a typical base station may include a central processing unit (CPU) or digital signal processor (DSP) for interconnecting and managing the various functional blocks described (CPU or DSP not shown). In fact, the various blocks of FIG. 2, including the message generator 240, message decoder 230, and scheduler 270 may be processes running on a CPU or DSP. The functional blocks shown are for clarity of discussion only, as those skilled in the art will recognize the myriad ways of implementing the blocks described herein in special purpose hardware, CPU or DSP, or combinations thereof, all within the scope of the present invention. The communicative links between the message decoder 230 and the message generator 240, and between the message decoder 230 and the scheduler 270 may include various blocks not shown, such as the aforementioned CPU or DSP.

Figure 3:
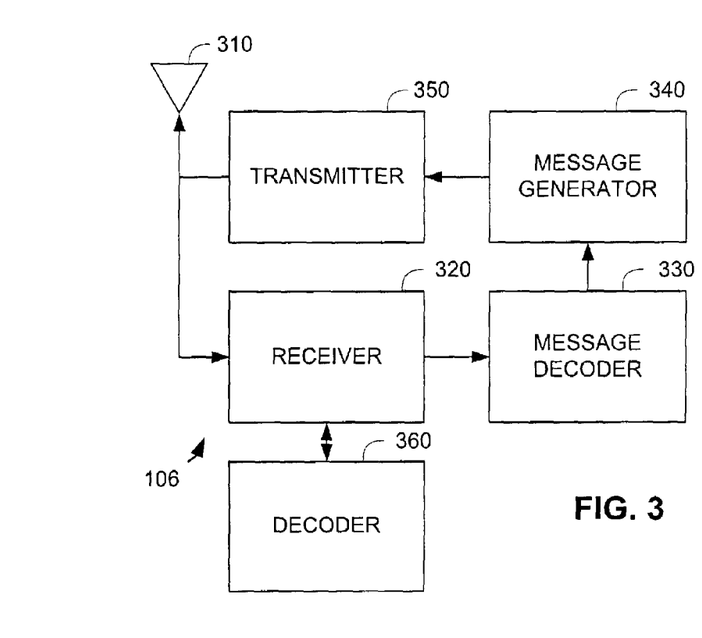
FIG. 3 depicts an exemplary mobile station.

FIG. 3 depicts an exemplary mobile station 106. For clarity, only a subset of the components relating to this description are shown. Reverse link signals are transmitted from and forward link signals are received on antenna 310. The reverse link signals are generated in transmitter 350. Transmitter 350 may process data for transmission using a variety of techniques, known in the art. Examples of such processing include Walsh Covering, pseudo-random noise (PN) spreading, interleaving, encoding, radio-frequency (RF) processing such as up-conversion and carrier modulation, and the like. Among other data that can be transmitted on the reverse link via transmitter 350 and antenna 310 are messages generated in message generator 340. Messages generated in message generator 340 may be control messages such as channel quality, acknowledgement, rate information and the like. Examples include the R-CQICH, R-ACKCH, and the R-RICH, each of which are processed and transmitted in transmitter 350.

Forward link signals are delivered from antenna 310 to receiver 320, where various processing, known in the art, is used to retrieve data from the forward link signals. Examples of the processing that can be performed in receiver 320 include amplification, RF down-conversion, demodulation (including PN despreading and Walsh decovering), combining, deinterleaving, decoding, and the like. Decoder 360 is shown communicatively coupled to receiver 320. Decoder 360 may be included as part of receiver 320, but is shown as a separate element in FIG. 3 for clarity of discussion below. Decoder 360 may decode according to one or more of a variety of decoding schemes known in the art. Examples include CRC decoders, convolutional decoders, turbo decoders, and the like. When receiving data on the F-PDCH, receiver 320 decovers the appropriate data symbols with the corresponding Walsh functions as defined in the current Walsh space.

Data from receiver 320 may have various destinations, one of which is shown as message decoder 330. Message decoder 330 can decode various messages sent from one or more base stations, such as the forward link messages described above. Message generator 340 is responsive to message decoder 330, in that some reverse link messages are generated in response to information carried in forward link messages. Note that a typical mobile station may include a central processing unit (CPU) or digital signal processor (DSP) for interconnecting and managing the various functional blocks described (CPU or DSP not shown). In fact, the various blocks of FIG. 3, including the message generator 340 and message decoder 330, may be processes running on a CPU or DSP. The functional blocks shown are for clarity of discussion only, as those skilled in the art will recognize the myriad ways of implementing the blocks described herein in special purpose hardware, CPU or DSP, or combinations thereof, all within the scope of the present invention. The communicative link between the message decoder 330 and the message generator 340 may include various blocks not shown, such as the aforementioned CPU or DSP.

In an embodiment, the base station only transmits to one mobile station on the F-PDCH at a time, although many users may be using packet services in a cell. Mobile stations are selected for forward link transmission based upon some scheduling algorithm. One such algorithm is disclosed in U.S. patent application Ser. No. 08/798,951, entitled "METHOD AND APPARATUS FOR FORWARD LINK RATE SCHEDULING", filed Feb. 11, 1997, assigned to the assignee of the present invention.

Alternatively, the base station can transmit to more than one mobile station on the F-PDCH at a time. In this case, the F-PDCH requires more than one Walsh code at a time.

During regular operation, a PDCH scheduler decides based on available power and Walsh codes, what modulation and data rate to use for transmitting data on the F-PDCH. In an embodiment, the PDCH scheduler is located within the scheduler 270. Alternatively, the PDCH scheduler may be located within the base station separate from the scheduler 270. When the PDCH scheduler is under loaded conditions or if the PDCH scheduler has trouble meeting scheduling deadlines, the PDCH scheduler can steal the power, or the power and the Walsh codes of voice calls using other channels, such as a forward fundamental channel (F-FCH).

Stealing a Walsh code means taking a channel for which a Walsh function (or code) has been allocated.

In the case where the F-PDCH has the Walsh codes to support data transmission, but does not have the available base station power to support data transmission, the PDCH scheduler steals base station power from a call being serviced by one of the other communication channels.

The amount of power needed to support PDCH data transmission can be taken from one or more other communication channels. In an embodiment, power is taken from as many other communication channels as needed to support PDCH data transmission.

In an embodiment, a random method is used to determine which communication channels from which to take power. In another embodiment, a round robin method is used to determine which communication channels from which to take power. In yet another embodiment, a priority method is used to determine which communication channels from which to take power. In an embodiment, a priority method is used wherein the channel selected from which power is taken, i.e., the channel selected for power stealing, is based on the power usage of the channel. The higher the power usage of the channel, the lower its priority and the less likely it will be selected for power stealing. The lower the power usage of the channel, the higher its priority and the more likely it will be selected for power stealing. It would be apparent to those skilled in the art that any selection algorithm known in the art can be used to select which communication channels will be selected for power stealing.

In yet another embodiment, a hybrid method is used to determine which communication channels from which to take power. It would be apparent to those skilled in the art that the hybrid method can be any combination of any selection algorithm known in the art.

Figure 4:
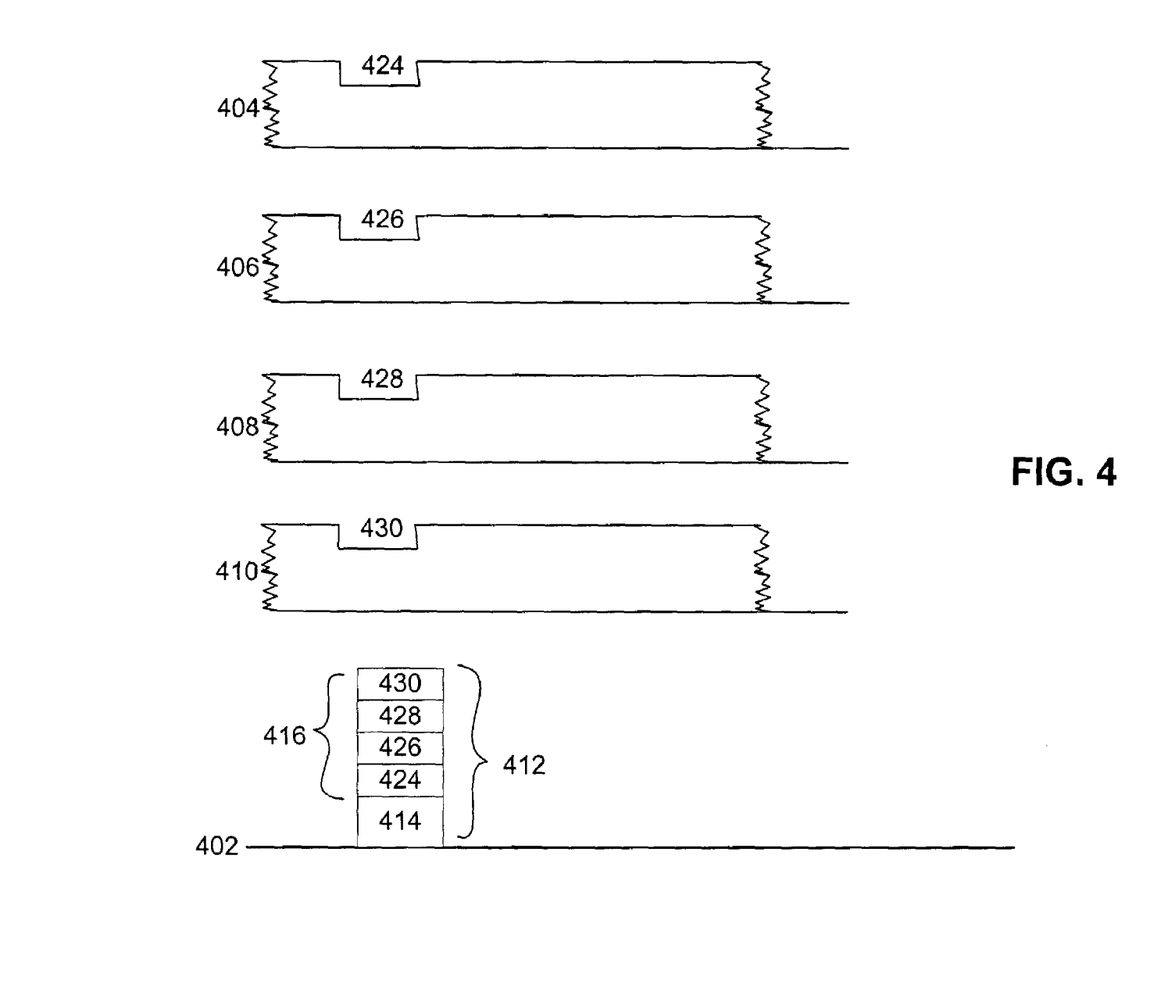
FIG. 4 shows a graphical representation of a data channel stealing power from four other channels in an embodiment.

In an embodiment, a fractional method may be used to provide the PDCH with the power it requires for data transmission. FIG. 4 shows a graphical representation of a data channel 402 stealing power from four other channels 404, 406, 408, 410 in an embodiment. There may not be enough power to support PDCH data transmission after power has been allocated to the other channels. Given an amount of power required to support a PDCH data transmission 412 and a smaller amount of power available for PDCH data transmission 414, then the difference in power needs 416 needs to be taken from other active channels, i.e., other channels that have power. Channels 404, 406, 408, and 410 are selected by the selection algorithm to provide the additional power 416 required by the PDCH for data transmission. Each channel provides a fraction of the power required by the PDCH for data transmission. Channel 404 provides power 424. Channel 406 provides power 426. Channel 408 provides power 428. Channel 410 provides power 430.

In another embodiment, a puncturing method may be used to provide the PDCH with the power it requires for data transmission. The additional power required by the PDCH may be punctured into the PDCH from the other channels. Thus, if the PDCH requires additional power for a period x, then each of the other channels can provide the additional power required for a period x/4. For example, if the PDCH requires additional power for five milliseconds (ms) and the other channels have 1.25 millisecond slots, then the other channels' power can be taken by the PDCH in succession. A first channel would not have power for the a first 1.25 ms, a second channel would not have power for a second 1.25 ms, a third channel would not have power for a third 1.25 ms, and fourth channel would not have power for a fourth 1.25 ms.

In yet another embodiment, both the fractional method and the puncturing method may be used to provide the PDCH with the power it requires for data transmission.

In the case where the F-PDCH neither has the Walsh codes or the base station power to support data transmission, the PDCH scheduler steals the Walsh codes and power from a call being serviced by one of the other communication channels.

The number of Walsh codes and power needed to support PDCH data transmission can be taken from one or more other communication channels. In an embodiment, Walsh codes and power are taken from as many other communication channels as needed to support PDCH data transmission.

In an embodiment, a random method is used to determine which communication channels from which to take power and a Walsh code. In another embodiment, a round robin method is used to determine which communication channels from which to take power and a Walsh code. In yet another embodiment, a priority method is used to determine which communication channels from which to take power and a Walsh code. In an embodiment, a priority method is used wherein the channel selected from which power and a Walsh code is taken, i.e., the channel selected for power and Walsh code stealing, is based on the power usage of the channel. The higher the power usage of the channel, the lower its priority and the less likely it will be selected for power and Walsh code stealing. The lower the power usage of the channel, the higher its priority and the more likely it will be selected for power and Walsh code stealing. It would be apparent to those skilled in the art that any selection algorithm known in the art can be used to select which communication channels will be selected for power and Walsh code stealing.

In yet another embodiment, a hybrid method is used to determine which communication channels from which to take power and a Walsh code. It would be apparent to those skilled in the art that the hybrid method can be any combination of any selection algorithm known in the art.

A base station serving multiple mobile stations each having a PDCH requiring Walsh codes and/or power must perform the selection algorithm for each PDCH.

Voice calls can tolerate some level of frame errors and corruption. A communication channel allocated to a voice call may deteriorate after a Walsh code or power has been stolen from the communication channel. However, the deterioration is gradual, and gives the PDCH scheduler some flexibility.

Figure 5A:
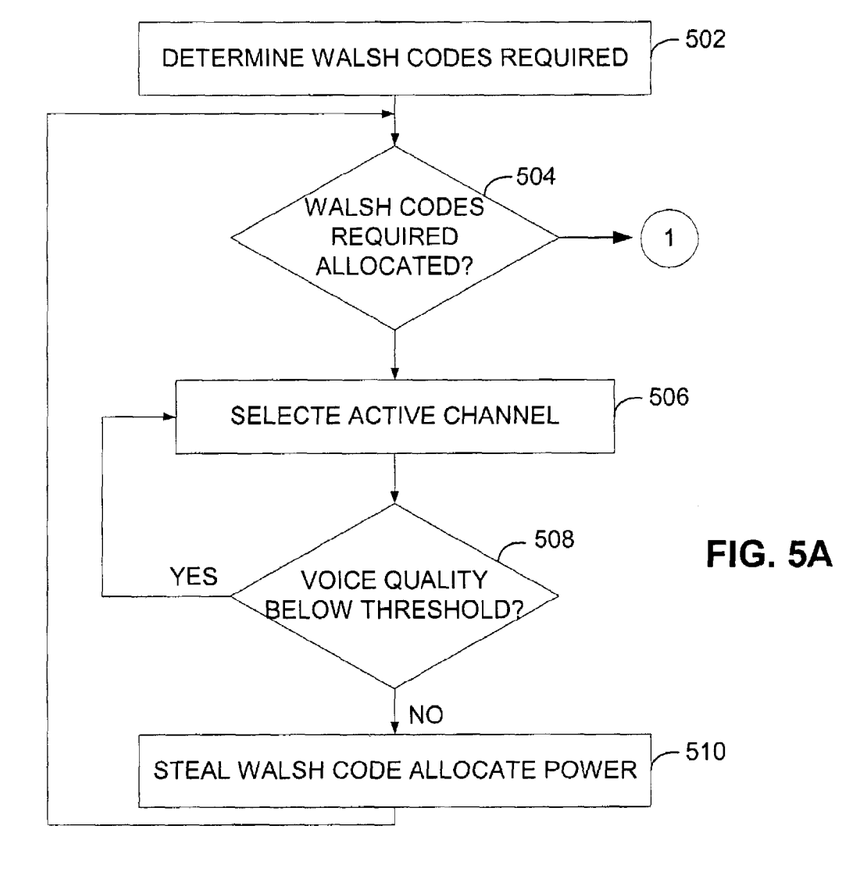
FIG. 5 shows a flowchart of a method for stealing power and code for data channel operations in an embodiment.
Figure 5B:
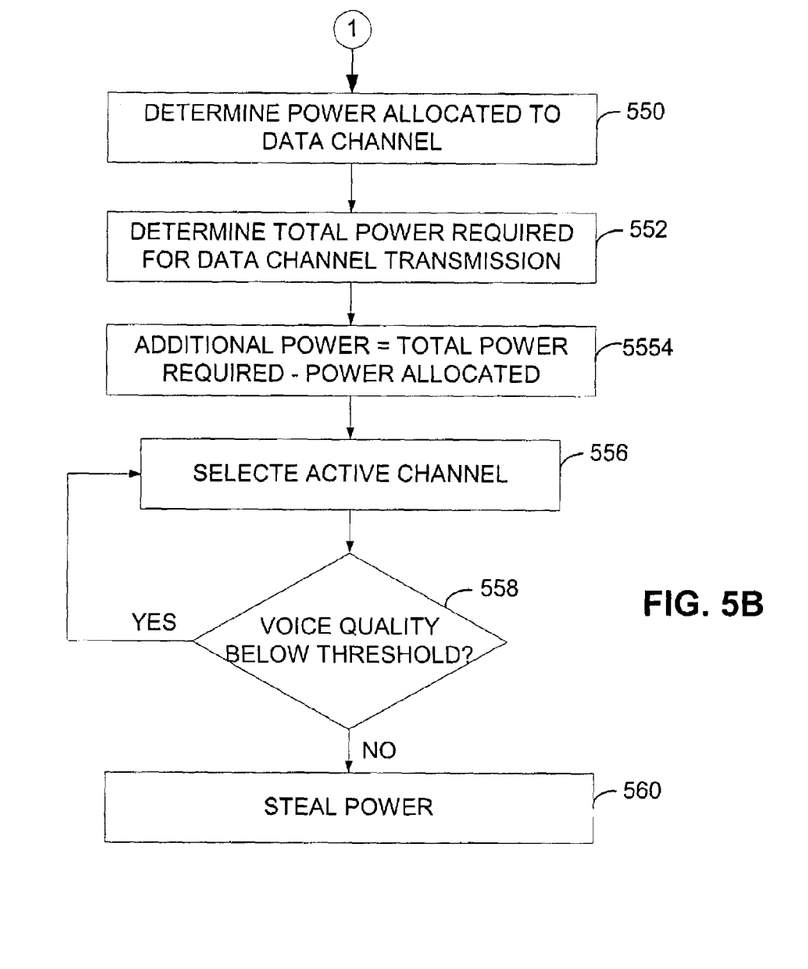

FIG. 5A and FIG. 5B shows a flowchart of a method for stealing power and code for data channel operations in an embodiment. In step 502, a number of Walsh codes required for data channel transmission is determined. In step 504, a test is made to determine whether the number of Walsh codes required for data transmission has been allocated to the data channel. If the number of Walsh codes required for data transmission has not been allocated to the data channel, then the flow of control goes to step 506. If the number of Walsh codes required for data transmission has been allocated to the data channel, then the flow of control goes to step 550.

In step 506, an active channel for stealing the active channel's Walsh code based on a selection algorithm is determined, the active channel being selected in response to the data channel requiring a Walsh code. In step 508, a test is performed to determine whether stealing the Walsh code from the selected active channel results in voice quality on the selected active channel deteriorating below a threshold. If the voice quality on the selected active channel would deteriorate below a threshold, then the flow of control loops back to step 506. If the voice quality on the selected active channel would not deteriorate below a threshold, then the flow of control goes to step 510.

In step 510, the Walsh code from the selected active channel is stolen and used for data channel transmission. In addition, the power for the active channel is allocated to the data channel. The flow of control goes to step 504.

In step 550, an amount of base station power allocated to the data channel is determined. In step 552, a total amount of power the data channel requires for data channel transmission is determined. In step 554, additional power the data channel requires is determined as the total amount of power the data channel requires for data channel transmission less the amount of data channel power allocated.

In step 556, an active channel for power stealing based on a selection algorithm is selected, the active channel being selected in response to the data channel requiring additional power.

In step 558, a test is performed to determine whether stealing power from the selected active channel results in voice quality on the selected active channel deteriorating below a threshold. If the voice quality on the selected active channel would deteriorate below a threshold, then the flow of control loops back to step 556. If the voice quality on the selected active channel would not deteriorate below a threshold, then the flow of control goes to step 560. In step 560, the power from the selected active channel is stolen and used for data channel transmission.

It should be noted that in all the embodiments described above, method steps could be interchanged or combined without departing from the scope of the invention. It would be apparent to those skilled in the art that more steps and methods that are known in the art can be added to improve the method of stealing power and code for data channel operations in an embodiment.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of data channel transmission comprising:
   determining an amount of power allocated to a data channel;
   determining a total amount of power the data channel requires for data channel transmission;
   determining additional power the data channel requires as the total amount of power the data channel requires for data channel transmission less the amount of data channel power;
   selecting an active channel for power stealing based on a selection algorithm, the active channel being selected in response to the data channel requiring additional power; and
   stealing power from the selected active channel and using the stolen power for data channel transmission.

2. The method of claim 1 further comprising:
   determining that the data channel requires a Walsh code for data channel transmission;
   selecting an active channel for stealing its Walsh code based on a selection algorithm, the active channel being selected in response to the data channel requiring a Walsh code; and
   stealing the Walsh code from the active channel and using the stolen Walsh code for data channel transmission.

3. The method of claim 1, wherein stealing power from the selected active channel is performed only if the amount of power stolen from the selected active channel does not degrade the performance of the selected active channel below a threshold.

4. The method of claim 1, wherein stealing power from the selected active channel is performed only if the amount of power stolen from the selected active channel does not cause voice quality on the selected active channel to deteriorate below a threshold.

5. The method of claim 2, wherein stealing the Walsh code from the selected active channel is performed only if voice quality on the selected active channel does not deteriorate below a threshold.

6. The method of claim 1, wherein said selection algorithm uses a random method, thereby causing all active channels to have an equal likelihood of being selected.

7. The method of claim 1, wherein said selection algorithm uses a round robin method to select active channels for power stealing based on a predetermined order.

8. The method of claim 1, wherein said selection algorithm uses a priority method to select active channels for power stealing based on power usage of the active channel.

9. The method of claim 8, wherein channels with higher power usage have lower priority and are less likely to be selected for power stealing, and channels with lower power usage have higher priority and are more likely to be selected for power stealing.

10. The method of claim 1, wherein said selection algorithm uses a hybrid method to select active channels for power stealing based on any combination of said priority method, round robin method, and random method.

11. The method of claim 1, wherein the power required for data transmission is stolen using a fractional method for using multiple active channels, each of said active channels providing a fraction of the power required, to provide power required for the data transmission.

12. The method of claim 11, wherein four of said active channels are selected, each of said four active channels providing one fourth of the power required.

13. The method of claim 1, wherein the power required for data transmission is stolen using a puncturing method for using a single active channel to provide the required power for data transmission during a portion of a data transmission.

14. The method of claim 13, wherein four of said active channels are selected to provide the required power for data transmission, each of said four channels providing the required power for data transmission during one fourth of the data transmission period.

15. The method of claim 1, wherein the power required for data transmission is stolen using a fractional and puncturing method for using multiple active channels to provide the required power for data transmission during a portion of the data transmission period.

16. An apparatus for wireless communication, comprising:
   means for determining an amount of power allocated to a data channel;
   means for determining a total amount of power the data channel requires for data channel transmission;
   means for determining additional power the data channel requires as the total amount of power the data channel requires for data channel transmission less the amount of data channel power;
   means for selecting an active channel for power stealing based on a selection algorithm, the active channel being selected in response to the data channel requiring additional power; and
   means for stealing power from the selected active channel and using the stolen power for data channel transmission.

17. The apparatus of claim 16, further comprising:
means for determining that the data channel requires a Walsh code for data channel transmission;
means for selecting an active channel for stealing its Walsh code based on a selection algorithm, the active channel being selected in response to the data channel requiring a Walsh code; and
means for stealing the Walsh code from the active channel and using the stolen Walsh code for data channel transmission.

18. A computer-readable medium for data channel transmission, encoded with instructions executable to:
determine an amount of power allocated to a data channel;
determine a total amount of power the data channel requires for data channel transmission;
determine additional power the data channel requires as the total amount of power the data channel requires for data channel transmission less the amount of data channel power;
select an active channel for power stealing based on a selection algorithm, the active channel being selected in response to the data channel requiring additional power; and
steal power from the selected active channel and using the stolen power for data channel transmission.

19. The computer-readable medium of claim 18, wherein said instructions are further executable to steal power from the selected active channel is performed only if the amount of power stolen from the selected active channel does not degrade the performance of the selected active channel below a threshold.

20. The computer-readable medium of claim 18, wherein said instructions are further executable to steal power from the selected active channel is performed only if the amount of power stolen from the selected active channel does not cause voice quality on the selected active channel to deteriorate below a threshold.

21. An apparatus for wireless communication, comprising:
a processing system configured to
determine an amount of power allocated to a data channel,
determine a total amount of power the data channel requires for data channel transmission,
determine additional power the data channel requires as the total amount of power the data channel requires for data channel transmission less the amount of data channel power,
select an active channel for power stealing based on a selection algorithm, the active channel being selected in response to the data channel requiring additional power, and
steal power from the selected active channel and using the stolen power for data channel transmission.

22. A base station, comprising:
a processing system configured to
determine an amount of power allocated to a data channel,
determine a total amount of power the data channel requires for data channel transmission,
determine additional power the data channel requires as the total amount of power the data channel requires for data channel transmission less the amount of data channel power,
select an active channel for power stealing based on a selection algorithm, the active channel being selected in response to the data channel requiring additional power, and
steal power from the selected active channel and using the stolen power for data channel transmission;
an antenna; and
a transmitter configured to transmit data on the data channel using the stolen power via the antenna.

* * * * *